United States Patent [19]
Hawkenson

[11] Patent Number: 4,805,389
[45] Date of Patent: Feb. 21, 1989

[54] ROTARY DEBRIS REMOVER

[75] Inventor: Bruce R. Hawkenson, Prince George, Canada

[73] Assignee: Hawk Forest Enterprises Ltd., Prince George, Canada

[21] Appl. No.: 206,317

[22] Filed: Jun. 14, 1988

[51] Int. Cl.$^4$ .......................... A01D 51/00; B27U 1/00
[52] U.S. Cl. ................................... 56/295; 15/236.01; 30/122; 30/347; 56/12.7; 144/1 F; 144/208 J; 241/101.1
[58] Field of Search ............ 144/1 R, 1 E, 1 F, 35 A, 144/208 R, 208 J; 56/12.7, 229, 233, 295; 15/236; 30/122, 169, 347; 241/101.1, 101.2, 101.7

[56] References Cited
U.S. PATENT DOCUMENTS

| | | | |
|---|---|---|---|
| 3,190,064 | 6/1965 | Wenzel et al. | 56/295 |
| 3,589,112 | 6/1971 | Frohmader | 56/295 |
| 3,753,338 | 8/1973 | Sherratt | 56/295 |
| 4,058,959 | 11/1977 | Moss et al. | 56/295 |
| 4,409,781 | 10/1983 | Blackstone | 56/295 |

Primary Examiner—W. Donald Bray
Attorney, Agent, or Firm—D. Ron Morrison

[57] ABSTRACT

A manually portable rotary debris remover, particularly adapted for clearing tree planting sites, has a remotely mounted, power driven, rotating hub on an extended support, such as a chain saw blade. The rotationally driven hub has a plurality of pairs of coiled tine members, each pair radiating out from a respective tine shaft mounted in the hub equidistantly from the hub axis. The tine shafts are each inclined from 3 to 10 degrees from perpendicular to the plane of rotation of the hub, so that, in rotating, the tines of each pair do not simultaneously strike objects in the path of rotation of the tines when clearing debris.

8 Claims, 1 Drawing Sheet

U.S. Patent Feb. 21, 1989 4,805,389
FIG. 1.
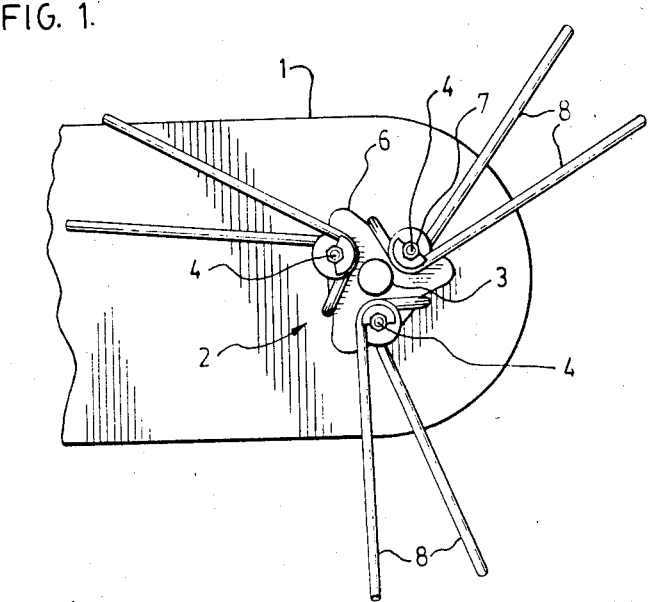
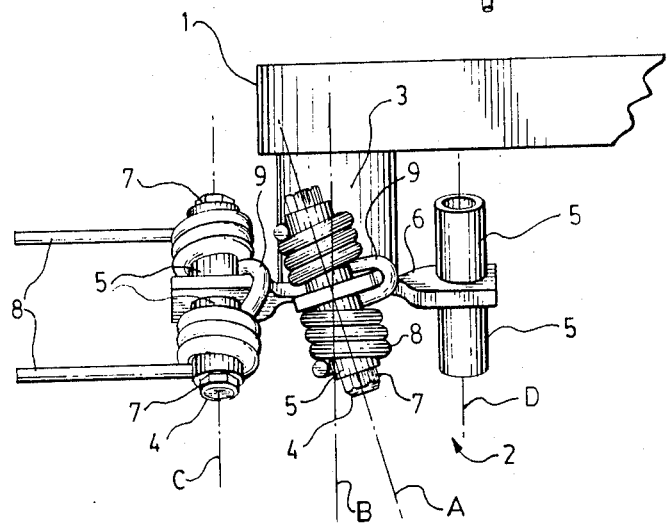
FIG. 2.

ROTARY DEBRIS REMOVER

This invention relates to a rotary debris remover, and more particularly to a manually portable debris remover for use in silviculture reforestation applications, for clearing tree planting sites, particularly in rough, rocky ground or terrain.

Wilderness forest areas which have been logged ordinarily have considerable debris on the ground, including grass, weeds, slash from prior logging, clods, stones, rocks, and other debris inhospitable to the planting of tree seedlings. Tree seedlings must be planted in ground having mineral matter therein, not humus having only decaying or decayed vegetable matter therein.

Canadian Pat. No. 1,231,034 issued Jan. 5, 1988 disclosed a particularly effective device for clearing debris in logged forest areas, the device comprising (1) a hub, (2) a rotationally driven shaft coupled to said hub, (3) a plurality of flexible tine members coupled to the hub, directed radially outwardly from the center of rotation of the hub, and capable of flexing to absorb the shock of contact with debris during rotation, and (4) means for driving the hub at rotational speeds sufficient to remove debris. The preferred flexible tine members disclosed in said patent were spring steel rods projecting radially from, and connected in pairs by, portions coiled around respective tine shafts affixed to the hub and radially spaced equidistant from and parallel to the axis of rotation of said hub. The preferred means for driving the hub was a chain saw or other manually portable means, for example, a belt and pulley means in lieu of a saw chain and sprocket on the blade or bar of a conventional chain saw.

In earlier U.S. Pat. No. 2,821,216 issued Jan. 28, 1958, there was disclosed an attachment for power driven chain saws which had a shaft mounted in bearing means in a chain saw blade, a saw chain driven sprocket wheel to turn the shaft, and chain link flails driven by the shaft to cut through vegetation and earth to form trenches in the soil. Probably because of the weight of the chain flails, the equipment was so heavy that it required wheeled support under the outer end of the saw blade to enable an operator to manoeuver the equipment over the ground. It has been fond that chain link flails are entirely unsuitable for ground clearing and debris removal on rocky ground, as the chain links are too prone to (1) breaking on impact with hard objects, such as rocks or stones, and (2) flinging broken links out in random directions, creating dangerous hazards for the operator.

Furthermore, it has been found that even the preferred flexible spring steel tines mounted on a portable rotary debris remover as disclosed in Canadian Pat. No. 1,231,034 are prone to some fracture and breakage on impacting rocks, although such breakage does not create the hazard of flying broken links encountered with chain flails. However, the broken coiled tines must be replaced on their tine shafts, and this requires interruption of the operation of the debris remover and replacement of the pair of tines normally connected at their coiled ends, the fractures occurring almost entirely in the portions connecting the coiled ends of the pairs of tines.

It is a principal object of this invention to provide a manually portable rotary debris remover having a plurality of flexible spring steel tines radially mounted on a rotationally driven hub, the mounting of the tines on the hub being arranged to provide improved resistance to fracture and breakage of the tines on high speed impact with hard objects such as stones and rock. This and other objects can be achieved by the invention which thus consists in a rotationally driven hub mounting for a plurality of pairs of tine members of a manually portable debris remover, said tine members being directed radially outwardly from the rotational axis or hub shaft of said hub mounting and connected in pairs by coiled ends movably coiled around respective coil axes passing through said hub mounting equidistantly from the shaft of the hub mounting and at angles inclined from the perpendicular to the plane of rotation of the hub mounting by an angle of from substantially 3 to substantially 10 degrees, said coil axes lying in a plane substantially tangent to the surface of the theoretical cylinder generated by rotation of said coil axes around the rotational axis of the hub mounting.

The invention will be more readily understood from the following description thereof with reference to the accompanying drawings in which identical reference numbers are used throughout for corresponding parts and in which:

FIG. 1 is a side elevation of a hub mounting in accordance with the invention as applied to a rotary debris remover as described in aforementioned Canadian Pat. No. 1,231,034, the hub mounting having three pairs of tines symmetrically mounted thereon, and FIG. 2 is a partial plan view of another hub mounting according to the invention but arranged to carry four pairs of tines symmetrically mounted on a hub.

In the drawings, 1 represents a casing enclosing a power driven means (not shown) for rotationally driving a hub mounting, indicated generally by 2. The hub mounting has a hub plate 6, rotated on a hub shaft, 3, by conventional driving means, for example a belt driven pulley or a chain driven sprocket, not shown, inside the casing. The embodiment of the invention illustrated in FIG. 1 has three evenly spaced tine axles or axes 4. Each tine axle optionally and conveniently is surrounded by a pair of cylindrical bushings 5, FIG. 2, most conveniently fabricated of nylon, spaced on their respective tine axles on either side of the hub plate and held in place on the axles by conventional means, for example, by tine axle nuts, 7, as shown. The embodiment of the invention illustrated in FIG. 2 is arranged to have four tine axles with bushings and tine axles evenly spaced thereon, this plan view of the figure showing the axle 4, bushings 5, and tines 8, at the top corner of the hub plate and on the left corner of the hub plate, and the bushings 5 on the right corner of the hub plate as viewed in the figure. The corresponding parts on the bottom corner of the hub plate are not shown.

A pair of tines 8 is coiled movably to rotate around each tine axle, the two tines at their free, distal ends projecting radially outwardly from their respective ends of the tine axle and also, when the hub mounting is rotating, radially outwardly from the hub shaft. The coiled inner ends of the tines are each wound around the axle and bushings towards the hub plate between the bushings, and are joined together to form a connection or bridge 9, over the edge of the hub plate. The bridge 9 is preferably formed by winding the pair of tines from a single length of spring steel rod, the center part of the length forming the bridge and the inner coiled ends of the tines being wound in opposite directions (clockwise and counter clockwise) around the axle, and bushings if these are present. The bridge connecting the coiled ends across the edge of the hub plate precludes the coils from complete rotation around the tine axle, but the coils are otherwise preferably free to rotate as much as this restriction permits.

To achieve optimum spring efficiency and performance from the paired coiled tines it is most preferred, if not essential, that the two tines, connected at their coiled ends, project radially in the direction substantially at right angles to the radial line from the coil axle to the junction or connection of their coiled ends.

If the tine axles were parallel to the hub shaft, the two radially projecting tines of a pair of rotating tines thus would simultaneously strike any large solid object they encounter. Also, they would recoil simultaneously in response to the impact of the tines against the object and the resultant tensioning of the coils whose rotation on the coil axles is limited by contact of the bridge with the edge of the hub plate.

Simultaneous impact of the two tines of a connected pair of tines and the resultant recoil has been found to create excessive strain on the coils and cause an undesirable and unacceptable amount of fracturing and breakage of the tines. With tine axles parallel to the hub shaft, two connected tines could be coiled to radiate divergently from the position substantially at right angles to the radial line from the coil axle to the junction of the coils, and thus avoid striking objects simultaneously as the tines rotate on the hub shaft. However, this arrangement fails to achieve the optimum spring efficiency and performance referred to above. However, simultaneous impact of the two parallel tines on a tine axle rotating around a hub axis can be avoided when the tine axle is inclined at an angle to the hub axis, as can be seen from FIGS. 1 and 2. The top tine coils in FIG. 2 and the tine axle A about which they are coiled can clearly be seen to be inclined at an angle to the hub axis B. It is this angle between axis A and axis B which should be in the range from 3 to 10 degrees. Each tine axle on the hub plate is similarly inclined, although the angle of projection for the other two tine axles C and D of FIG. 2 does not permit this to show as clearly in the Figure. Similarly in FIG. 1, the angle of projection does not permit the angle of inclination of the coil axles with respect to the hub axis to show clearly, but the angle between the two tines of each pair in FIG. 1 illustrates clearly that the axles of the tine coils are similarly inclined. It can also be appreciated from these Figures that the tine axles lie in planes tangent to the surface of the theoretical cylinder generated by rotation of the coil axes around the rotational axis of the hub shaft.

It also can be clearly seen from FIG. 1 that, in rotating around the hub axis, B, the two tines of each pair would not simultaneously strike any stationary object in the rotational path of their tips, unless of course the surface of the object happened to be inclined to the path of the tines at the same angle as the tine coils are inclined to the hub axis; this would be a most uncommon occurrence. Because the two tines of a connected pair do not normally strike an object simultaneously, the tines of each pair deflect at slightly different times and recoil at slightly different times, and this greatly reduces the stress placed on the weakest connecting part. It may also be that one tine of a pair is deflected then released to recoil as the second is being deflected, and the recoil of the first tine is partially absorbed by the deflection of the second tine, depending on the angle between them.

Tests and experience have shown that the life of pairs of coiled tines can be extended enormously by having the tine axles inclined at an angle to the hub axis as described above. In an initial test of an embodiment of the invention comparing (a) pairs of parallel tines mounted on axes parallel to a rotating hub axis with (b) pairs of parallel tines mounted on axes inclined between 3 and 10 degrees to the rotating hub axis of the same rotary debris remover, using uniform dry hardwood objects as the debris, over a period of 70 operating minutes six tine pairs broke, requiring replacement, with the tine axles parallel to the hub axis; over a period of 95 operating minutes only two tine pairs broke and required replacement with the inclined tine axles. The tine pairs all were formed from the same quarter inch diameter round spring steel wire rod stock. The tine coils were made with 3 ½ turns of ¾ inches (1.9 cm) internal diameter, with the tine ends projecting 3 inches (7.6 cm) from the ends of the respective coils. In a more extensive durability test, again using hardwood objects as the debris, the relative durability of (a) tine coils mounted on axes parallel to a rotating hub axis and (b) tine coils mounted on axes inclined between 3 and 10 degrees to the rotating hub axis, the parallel mounted coils suffered six breaks in seven hours of cumulative operation, and the inclined coils suffered only one break in eight and one half hours cumulative operation under otherwise identical conditions.

Numerous modifications and variations can be made in the specific expedients and embodiments described without departing from the invention, the scope of which is defined in the following claims.

What is claimed is:

1. A rotationally driven hub mounting for a plurality of pairs of tine members of a manually portable debris remover, said tine members being directed radially outwardly from the rotational axis of said hub mounting and connected in pairs by coiled ends movably coiled around respective coil axes passing through said hub mounting equidistantly from the rotational axis of the hub mounting and at angles inclined from the perpendicular to the plane of rotation of the hub mounting by an angle of from substantially 3 to substantially 10 degrees, said coil axes lying in a plane substantially tangent to the surface of the theoretical cylinder generated by rotation of said coil axes around the rotational axis of the hub mounting.

2. A manually portable rotary debris remover comprising:
   (a) power means for rotating a remotely mounted driven shaft,
   (b) a hub mounting fastened on and rotated by said shaft,
   (c) a plurality of tine members directed radially outwardly from the rotational axis of said hub mounting and connected in pairs by coiled ends coiled around respective coil axes which pass through said hub mounting equidistantly from the rotational axis of the hub mounting, characterized in that said coil axes are at angles inclined from the perpendicular to the plane of rotation of the hub mounting by an angle of from substantially 3 to substantially 10 degrees and said coil axes lie in a plane substantially tangent to the surface of the theoretical cylinder generated by rotation of said coil axes around the rotational axis of the hub mounting.

3. A rotationally driven hub mounting as claimed in claim 1, in which the coiled ends of the tines are movably coiled around bushings mounted on axes passing through said hub mounting and forming said coil axes.

4. A debris remover as claimed in claim 2, characterized in that the coiled ends of the tines are coiled around bushings mounted on axles passing through said hub mounting and forming the said coil axes.

5. A rotationally driven hub mounting as claimed in claim 1 in which the respective pairs of tine members are each formed from a single length of spring steel rod, the center part of the length forming the connection between the coiled inner ends of the tines, the coiled inner ends being wound in opposite directions respectively around their coil axis.

6. A debris remover as claimed in claim 2, characterized in that the respective pairs of tine members are each formed from a single length of spring steel rod, the center part of the length forming the connection between the coiled inner ends of the tines, the coiled inner ends being wound in opposite directions respectively around their coil axis.

7. A rotationally driven hub mounting as claimed in claim 5 in which the tines of each pair project radially from their respective coil axis in the direction substantially at right angles to the radial line from their coil axle to the connection of their coiled ends.

8. A debris remover as claimed in claim 6, characterized in that the tines of each pair project radially from their respective coil axis in the direction substantially at right angles to the radial line from their coil axle to the connection of their coiled ends.

* * * * *